(12) United States Patent
Tung

(10) Patent No.: US 10,433,168 B2
(45) Date of Patent: Oct. 1, 2019

(54) METHOD AND SYSTEM FOR COMBINATION WIRELESS AND SMARTCARD AUTHORIZATION

(71) Applicant: Quanta Computer Inc., Taoyuan (TW)

(72) Inventor: Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 143 days.

(21) Appl. No.: 14/978,053

(22) Filed: Dec. 22, 2015

(65) Prior Publication Data

US 2017/0180987 A1 Jun. 22, 2017

(51) Int. Cl.
*H04W 12/06* (2009.01)
*G06F 21/34* (2013.01)
*H04L 9/32* (2006.01)

(52) U.S. Cl.
CPC ............ *H04W 12/06* (2013.01); *G06F 21/34* (2013.01); *H04L 9/3226* (2013.01); *H04L 9/3234* (2013.01)

(58) Field of Classification Search
CPC ............................... H04W 12/06; G06F 21/34
See application file for complete search history.

(56) References Cited

U.S. PATENT DOCUMENTS

| | | | | |
|---|---|---|---|---|
| 5,068,894 A | * | 11/1991 | Hoppe | G06Q 20/341 235/379 |
| 7,024,695 B1 | * | 4/2006 | Kumar | G06F 11/0748 713/159 |
| 2002/0129266 A1 | * | 9/2002 | Bender | G07F 7/08 726/26 |
| 2004/0039708 A1 | * | 2/2004 | Zhang | G06Q 20/341 705/67 |
| 2007/0028118 A1 | * | 2/2007 | Brown | G06Q 20/341 713/185 |
| 2007/0118745 A1 | * | 5/2007 | Buer | G06F 21/34 713/168 |
| 2007/0130481 A1 | * | 6/2007 | Takahashi | G06F 21/41 713/300 |

(Continued)

FOREIGN PATENT DOCUMENTS

| | | |
|---|---|---|
| TW | I326183 B | 6/2010 |
| TW | I394478 B | 4/2013 |
| WO | WO 2009041804 A2 * | 4/2009 ........... H04L 9/3271 |

OTHER PUBLICATIONS

Taiwanese Office Action for Application No. 105108763, dated Mar. 13, 2017, w/ First Office Action Summary.

(Continued)

*Primary Examiner* — Chau Le
*Assistant Examiner* — Vance M Little
(74) *Attorney, Agent, or Firm* — Nixon Peabody LLP; Zhou Lu

(57) ABSTRACT

A system, method, and non-transitory computer-readable medium for a combination wireless and smartcard login authentication is disclosed. The method discloses validating a smartcard to yield a validation and establishing, based on the validation, a wireless connection with a remote device. The method can further include receiving a smartcard passcode verifying the smartcard passcode to yield a verification, and authorizing, based on the verification and at the server, the remote device access to a baseboard management controller of the server.

18 Claims, 9 Drawing Sheets

(56) References Cited

U.S. PATENT DOCUMENTS

| | | | |
|---|---|---|---|
| 2007/0204332 A1* | 8/2007 | Pan | G06F 21/31 |
| | | | 726/5 |
| 2009/0172376 A1* | 7/2009 | Kiiveri | G06F 21/575 |
| | | | 713/2 |
| 2009/0221265 A1 | 9/2009 | Liu et al. | |
| 2011/0132987 A1* | 6/2011 | Hoeksel | H04W 4/70 |
| | | | 235/492 |
| 2011/0202983 A1* | 8/2011 | Pope | G06F 21/572 |
| | | | 726/7 |
| 2011/0256832 A1* | 10/2011 | Park | H04B 5/0056 |
| | | | 455/41.2 |
| 2011/0315763 A1* | 12/2011 | Hochmuth | G06F 15/16 |
| | | | 235/380 |
| 2012/0254878 A1* | 10/2012 | Nachman | G06F 9/5094 |
| | | | 718/102 |
| 2013/0179558 A1* | 7/2013 | Lin | H04L 41/04 |
| | | | 709/223 |
| 2017/0078877 A1* | 3/2017 | Chudy | H04W 12/06 |

OTHER PUBLICATIONS

Taiwanese Search Report for Application No. 105108763, dated Mar. 13, 2017.

* cited by examiner

METHOD AND SYSTEM FOR COMBINATION WIRELESS AND SMARTCARD AUTHORIZATION

FIELD OF TECHNOLOGY

The subject matter herein generally relates to server authentication. More specifically, the subject matter herein relates to a combination wireless and smartcard authentication of a baseboard management controller of a server.

BACKGROUND

A baseboard management controller (BMC) is a specialized microcontroller, generally embedded on a motherboard of a server. The general purpose of the BMC is to: (1) manage the interface between the server hardware and the server management software, and (2) enable a system administrator to remotely monitor the server. The BMC can be in communication with different sensors to monitor server parameters (e.g., temperature, humidity, power supply voltage, fan speed, communication parameters, operating system functions, network status, etc.). The BMC can include a plurality of physical interfaces (e.g., system management bus (SMB), universal asynchronous receiver/transmitting (UART), universal serial bus (USB), RS-232 serial consoles, network adapters, etc.). System administrators can connect to the BMC by direct connection through a physical interface or by a network connection. Authentication for the connections is generally through username and password. Passwords are only as secure as their creators and can remain unchanged for long periods of time. Unauthorized access to the BMC can enable an unauthorized user complete access to the server. A more secure system and method of accessing the BMC is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In at least one embodiment, a method, system and non-transitory computer readable medium for a combination wireless and smartcard login authentication is disclosed. The method can include validating, at a server, a smartcard to yield a validation and establishing, based on the validation, a wireless connection with a remote device. The method can further include receiving a smartcard passcode and verifying the smartcard passcode to yield a verification. Finally, the method can include authorizing, based on the verification, the remote device access to a baseboard management controller of the server.

In some embodiments, the method can include enabling, at the server, smartcard authorization, validating a smartcard to yield a validation, and transmitting, based on the validation, a random number.

In some embodiments the method can include transmitting a random number and receiving, at the server, an encrypted passcode, wherein the encrypted passcode is an encrypted random number generated from the random number. The method can further include storing, at the server, as the smartcard passcode the encrypted passcode.

In some embodiments the method can include the verifying including transmitting, from the server, the smartcard passcode, wherein the smartcard passcode is encrypted. The method can further include receiving, at the server, a successful verification when the decrypted smartcard passcode is equal to a previously stored random number.

In some embodiments the method can include receiving, at the server, login credentials for a console session and authenticating, at the server, the login credentials. The method can further include transmitting, from the server, the smartcard passcode, wherein the smartcard passcode is encrypted.

In some embodiments the method can include receiving, at a second server, login credentials for a console session and authenticating, at the second server, the login credentials. The method can further include receiving, at the second server, the encrypted smartcard passcode.

In some embodiments the method can include establishing, at the server, a wireless connection with the remote device, receiving login credentials and authenticating the login credentials. The method can further include transmitting the smartcard passcode and enabling smartcard authorization.

BRIEF DESCRIPTION OF THE DRAWINGS

Implementations of the present technology will now be described, by way of example only, with reference to the attached figures, wherein.

DETAILED DESCRIPTION

Figure 1:
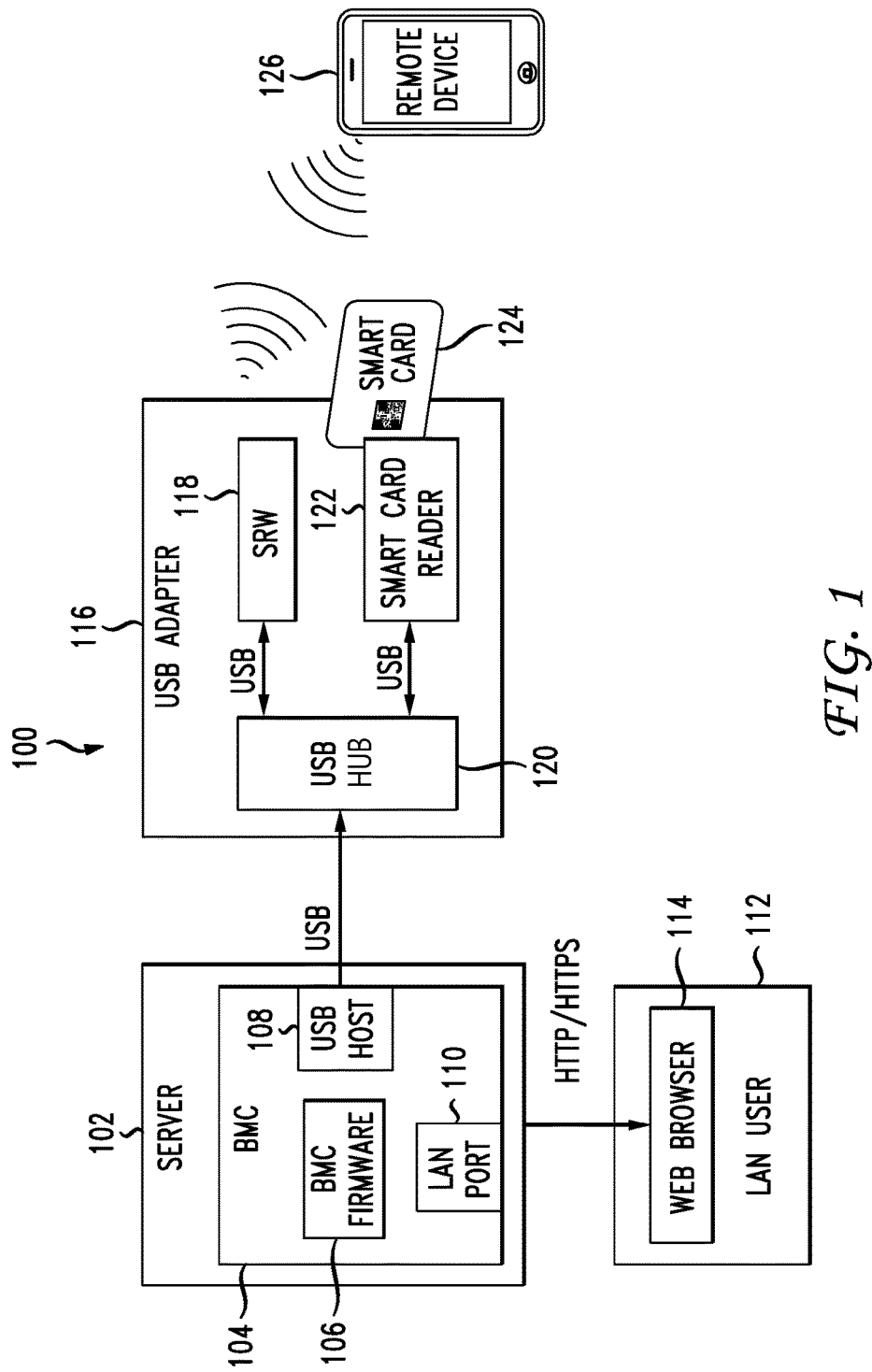
FIG. 1 illustrates a block diagram of an example combination BMC authorization system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates a block diagram of an example combination BMC authorization system 100. Combination BMC authorization system 100 can include one or more servers 102. The one or more servers 102 can include a baseboard management controller (BMC) 104. The BMC 104 can be a specialized server processor coupled to one or more motherboards of server 102. In some embodiments, the BMC can monitor the physical state (e.g., temperature, humidity, power supply voltage, fan speed, communication parameters, operating system functions, network status, etc.) of the server 102 by a plurality of sensors (not shown). The BMC 104 can run firmware 106. BMC firmware 106 can be configured to control, monitor, and/or manipulate the hardware components of server 102. Server 102 can also include one or more peripheral ports including a universal serial bus (USB) port 108 and a local area network (LAN) port 110.

Combination BMC authorization system 100 can include a LAN user 112. LAN user 112 can be an electronic device (e.g., computing system, tablet, smartphone, etc.) configured to communicate with server 102 through web browser 114 by a system administrator. LAN user 112 can communicate with server 102 over a local area network using hypertext transport protocol (HTTP) or secure HTTP. Through web browser 114, LAN user 112 can be configured to access a BMC web management console (i.e., to manage settings of the BMC). In some embodiments, LAN user 112 can enable and disable smart card authorization on BMC 104.

Server 102 of combination BMC authorization system 100 can be configured to accept a USB adapter 116 at USB port 108. USB adapter 116 can include a USB hub 120. USB hub 120 can expand a single USB port into one or more USB ports. USB hub 120 can couple to a short-range wireless adapter (SRW) 118 and a smartcard reader 122. Server 102 can run chip card interface device (CCID) protocol that enables smartcard 124 to connect to server 102 by smartcard reader 122. The CCID protocol enables smartcard 124 to be used as a security token for authentication and data encryption.

Short-range wireless adapter 118 can be configured to transmit and receive data over short distances. For example, short-range wireless adapter 118 can be configured to use Bluetooth, Millimeter Wave Gigabit Wireless (Gifi), near field communication (NFC), ZigBee, etc. Mobile device 126 (e.g., smartphone, tablet, laptop, etc.) can be configured to couple with USB adapter 116 through short-range wireless adapter 118 (e.g., pairing, bonding, etc.). Smartcard reader 122 can be configured to accept smartcard 124. Smartcard 124 can be embedded with an integrated circuit. Smartcard 124 can be contact or contactless. In some embodiments, smartcard 124 can be configured to store an encrypted passcode. In some embodiments, smartcard 124 can be configured to store authentication credentials (e.g., password, owner identification, etc.).

The methods illustrated in FIGS. 2-9 are provided by way of example, as there are a variety of ways to carry out the method. Additionally, while the example method is illustrated with a particular order of steps, those of ordinary skill in the art will appreciate that FIGS. 2-9 and the steps illustrated therein can be executed in any order that accomplishes the technical advantages of the present disclosure and can include fewer or more steps than illustrated.

Each step shown in FIGS. 2-9 represents one or more processes, methods or subroutines, carried out in example method. The steps illustrated in FIGS. 2-9 can be implemented in a system illustrated in FIG. 1. The flow charts illustrated in FIG. 2-9 will be described in relation to and make reference to at least server 102, USB adapter 116, mobile device 126, LAN user 112, and smartcard 124 as illustrated in FIG. 1.

Figure 2:
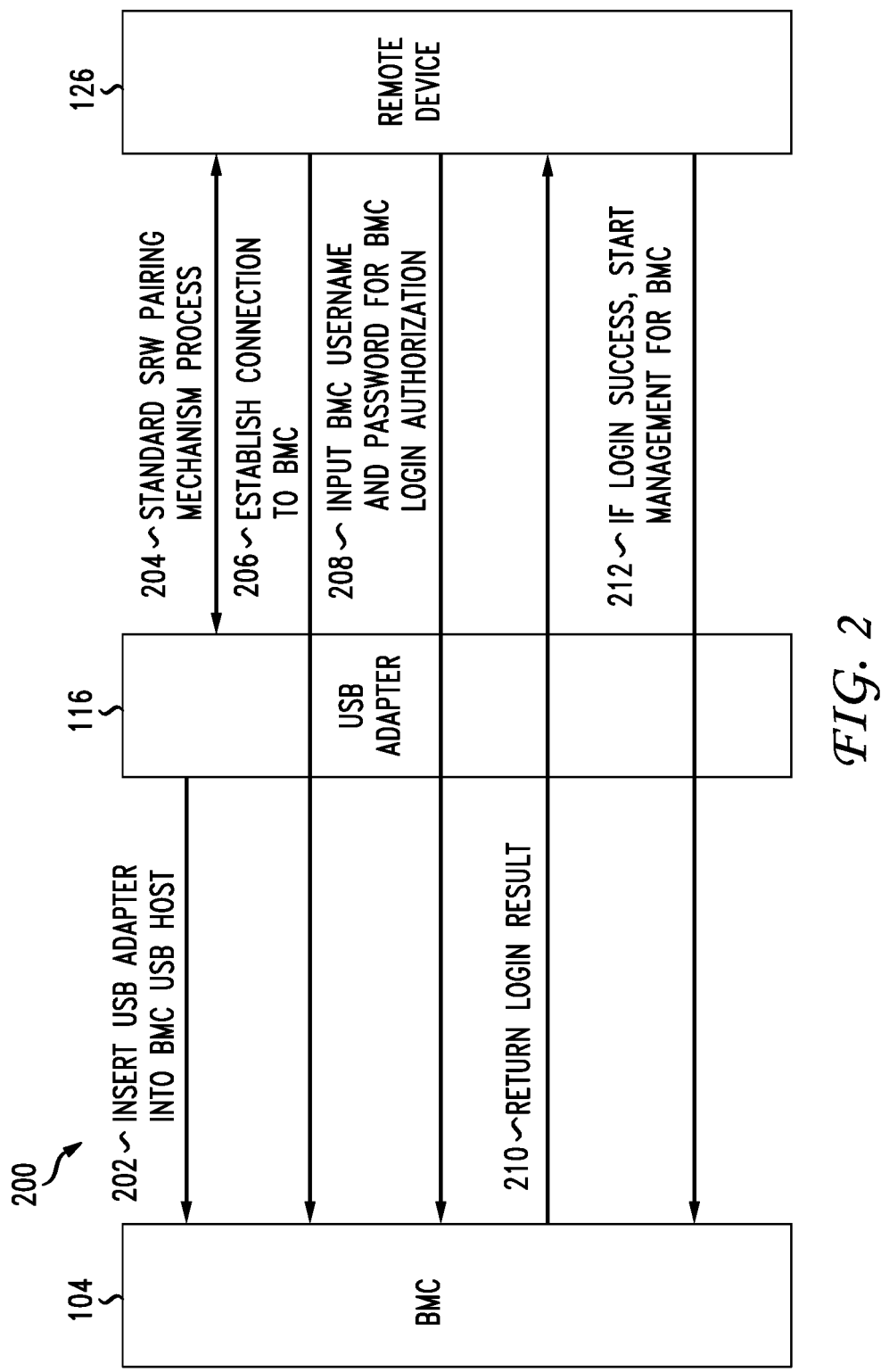
FIG. 2 is flow diagram of an example method of a traditional BMC login authentication.

FIG. 2 is flow diagram of an example method 200 of a traditional BMC login authentication 200. A traditional BMC login authentication is password based (e.g., an administrator needs to remember a password to login to the BMC 104). Method 200 can begin at step 202. At step 202, a USB adapter 116 can be coupled to server 102 at port 108. When the USB adapter 116 has been coupled to server 102, method 200 can proceed to step 204.

At step 204, mobile device 126 can communicatively couple (i.e., by short-range wireless) with USB adapter 116. In some embodiments, mobile device 126 can pair with USB adapter 116, by short-range wireless adapter 118, using secure simple pairing (SSP). When mobile device 126 has successfully coupled to USB adapter 116, method 200 can proceed to step 206.

At step 206, mobile device 126 can establish a connection with BMC 104. For example, mobile device 126 can access server 102 and BMC 104 through USB adapter 116, after a successfully pairing in step 204. When mobile device 126 has successfully established a connection with BMC 104, method 200 can proceed to step 208.

At step 208, mobile device 126 can transmit a login credentials to BMC 104. For example, an administrator of mobile device 126 can enter a user name and password for BMC 104. When login credentials have been transmitted to BMC 104, the method 200 can proceed to step 210. At step 210, BMC 104 can receive the login credentials, authenticate the credentials, and return the results to mobile device 126. For example, BMC 104 can receive a user name and password, authenticate the user name and password as valid, and return to the mobile device 126 an unsuccessful authentication (i.e., when the user name and password are incorrect) or a successful authentication (i.e., when the user name and password are correct). In some embodiments, the authentication is performed by a comparison of encrypted login credentials stored in a database. When the results of the login authentication have been returned to the mobile device 126, method 200 can proceed to step 212. At step 212, when the returned login authentication is unsuccessful, method 200 can return to step 208. When the returned login authentication is successful, the method 200 can enable management access of BMC 104 to mobile device 126 and method 200 can end.

Figure 3:
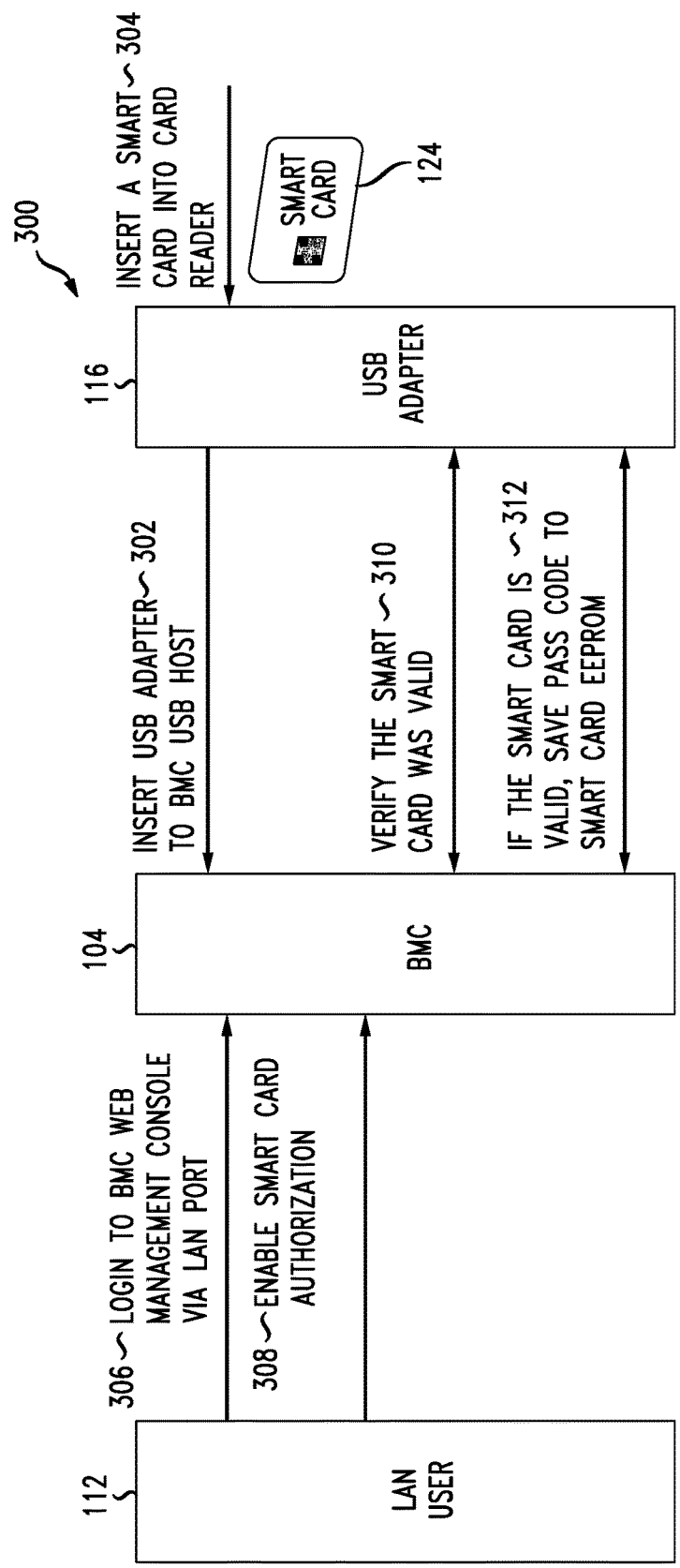
FIG. 3 is flow diagram of an example method of a BMC initialization of an improved BMC login authentication.

FIG. 3 is flow diagram of an example method 300 of a BMC initialization of an improved BMC login authentication. An improved BMC login authentication can add additional security for accessing BMC 104 of server 102. For example, improved BMC login authentication can use a combination authentication of smartcard 124 and mobile device 126, where traditional BMC login authentications are password based. Method 300 illustrates initializing an improved BMC login authentication on BMC 104.

Method 300 can begin at step 302. At step 302 a USB adapter 116 can be coupled to server 102 at USB port 108. When the USB adapter 116 has been coupled to server 102, method 300 can proceed to step 304. At step 304, a smartcard 124 can be inserted into USB adapter 116. When a smartcard 124 has been inserted into USB adapter 116, the method 300 can proceed to step 306. At step 306, LAN user 112 can login to BMC 104 (e.g., through web browser 114 over LAN port 110). When LAN user 112 has logged in to BMC 104, method 300 can proceed to step 308. At step 308, LAN user 112 can enable smartcard authorization on BMC 104. For example, a system administrator can login into BMC 104 by a web management console. The system administrator can then enable or disable smartcard authorization for BMC 104 (i.e., allow smartcard authorization or not allow smartcard authorization). When smartcard authorization has been enabled, the method 300 can proceed to step 310.

At step 310, BMC 104 can determine if smartcard 124 is valid. For example, smartcard 124 can have a validity period. Upon expiration of the validity period, smartcard 124 is no longer valid (i.e., smartcard 124 cannot be used for authentication). In one embodiment, smartcard 124 is valid for three years after issuance. When BMC 104 has been validated, method 300 can proceed to step 312.

Figure 5:
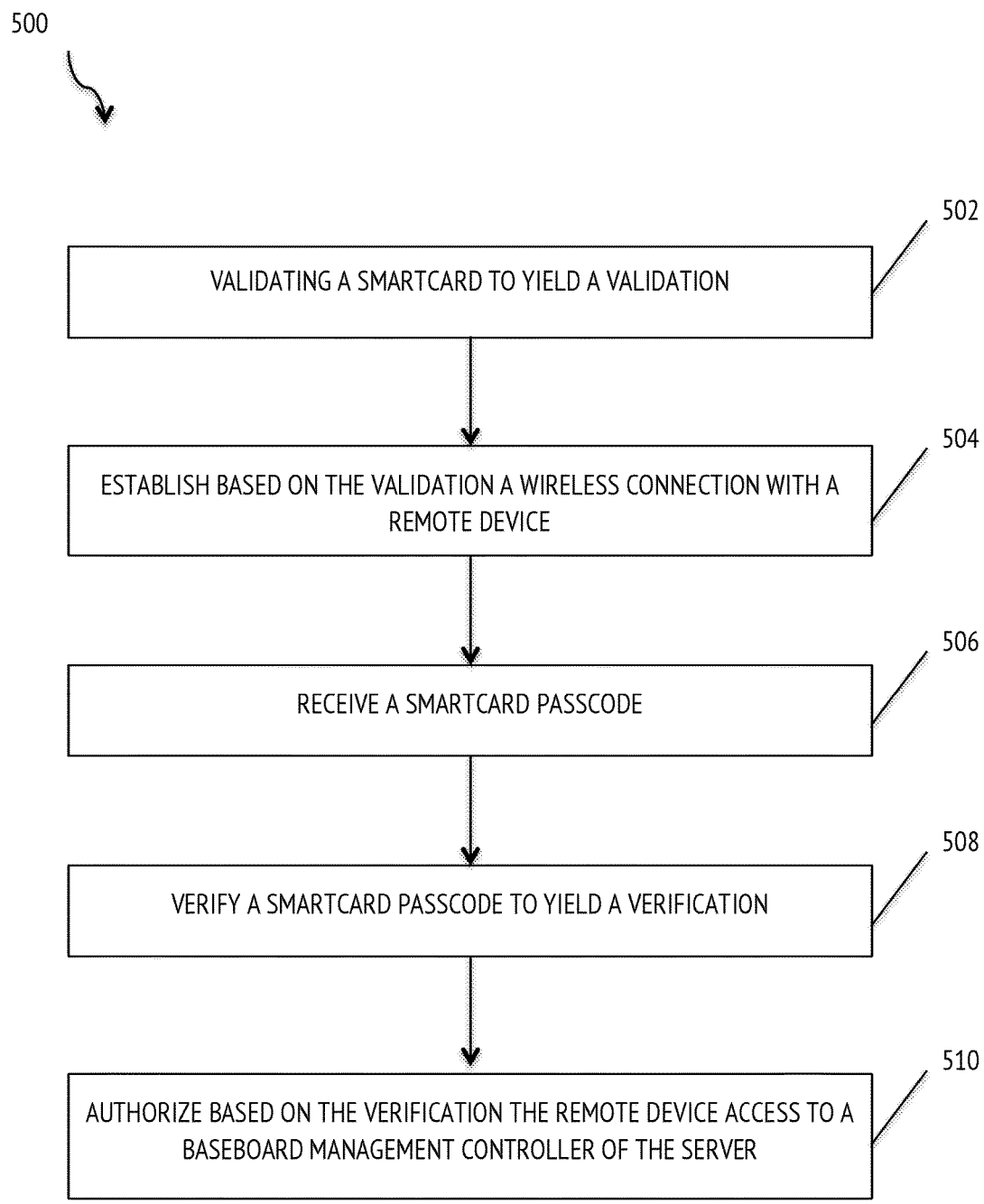
FIG. 5 is flow diagram of an example method of a mobile device and smart card improved BMC login authentication.

At step 312, a passcode can be saved on smartcard 124 (as illustrated in FIG. 5). For example, smartcard 124 can include an integrated circuit. The integrated circuit can include a plurality of pinouts. One pinout of the integrated circuit can be configured to program a persistent memory (e.g., EEPROM). When the passcode has been saved on smartcard 124, method 300 can end.

Figure 4:
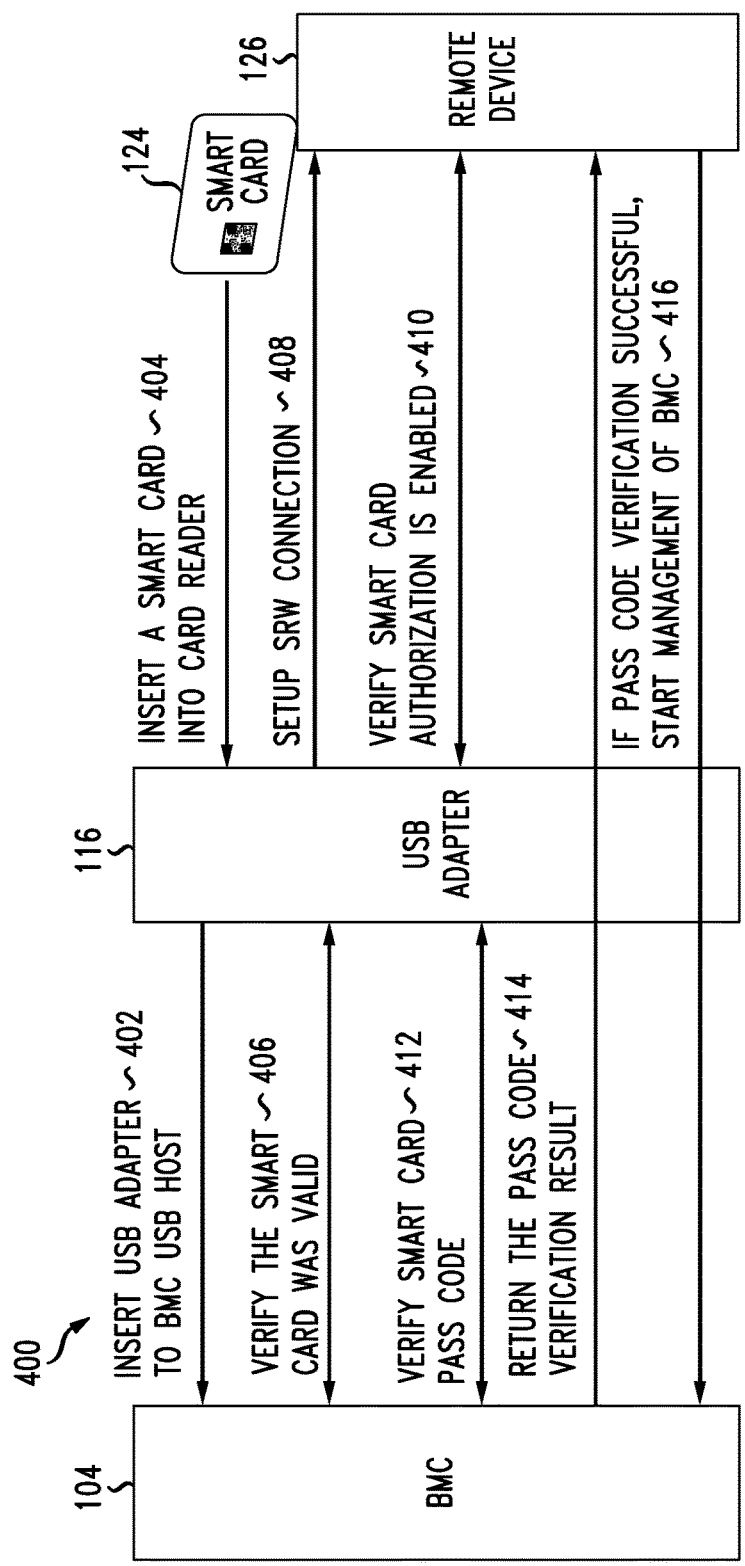
FIG. 4 is flow diagram of an example method of a mobile device and smart card improved BMC login authentication.

FIG. 4 is flow diagram of an example method 400 of a mobile device and smart card improved BMC login authentication. When BMC 104 has been initialized (i.e., smartcard authentication has been enabled) a user can login to BMC by smartcard 124 and mobile device 126.

Method 400 can begin at step 402. At step 402, a USB adapter 116 can be coupled to server 102 at USB port 108. When the USB adapter 116 has been coupled to server 102, method 400 can proceed to step 404. At step 404, a smartcard 124 can be inserted into USB adapter 116 at smartcard reader 122. When a smartcard 124 has been inserted into USB adapter 116, the method 400 can proceed to step 406. At step 406, BMC 104 can determine if smartcard 124 is valid (as illustrated above). When BMC 104 has validated smartcard 124, method 400 can proceed to step 408. At step 408, mobile device 126 can successfully pair (i.e., establish a connection) with USB adapter 116. For example, mobile device 126 can access to server 102 and BMC 104 after a successfully pairing. When mobile device 126 has successfully paired with USB adapter 116, method 400 can proceed to step 410. At step 410, the passcode of smartcard 124 can be transmitted to BMC 104 for authentication when smartcard authorization has been enabled (e.g., by short-range wireless connection established in step 408). When the passcode of smartcard 124 has been transmitted to BMC 104, method 400 can proceed to step 412.

Figure 6:
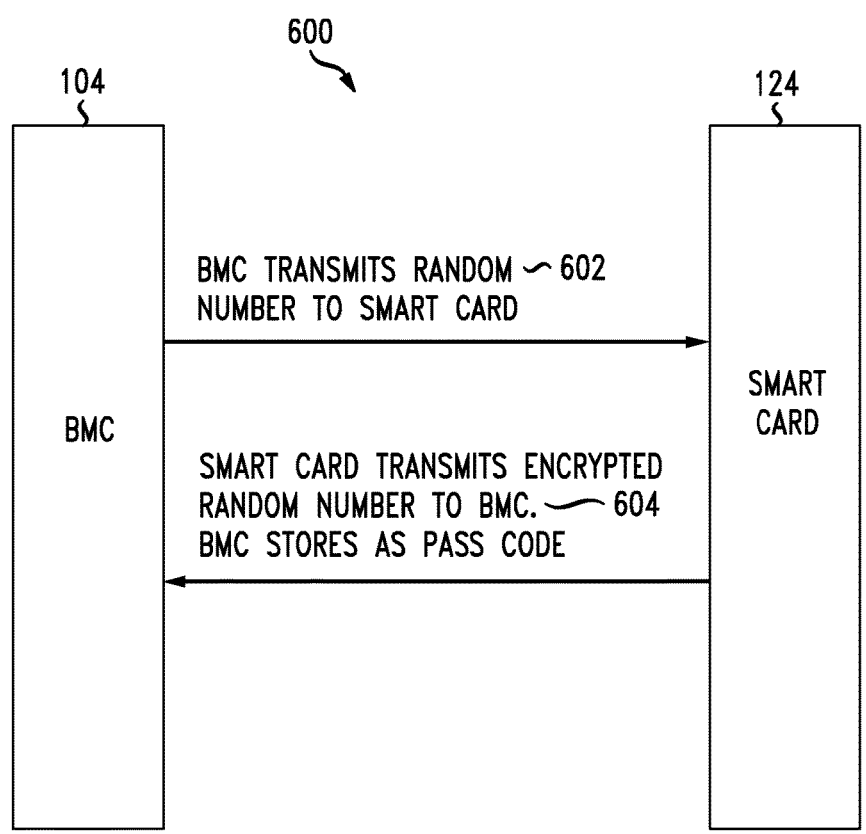
FIG. 6 is flow diagram of an example method of a saving a passcode of an improved BMC login authentication.

At step 412, BMC 104 can authenticate (i.e., verify) the passcode of smartcard 124 (as illustrated in FIG. 6). At step 414, BMC can transmit the result of the authentication at step 412 to mobile device 126. When the BMC has transmitted the results of the authentication to mobile device 126, the method 400 can proceed to step 416.

At step 416, mobile device 126 can receive the results of the passcode authentication. When the results of the authentication are unsuccessful, mobile device 126 is not authorized to manage BMC 104 and method 400 can end. When the results of the authentication are successful, mobile device 126 can begin management of BMC 104 (e.g., monitor server 102). When the results of the authentication are successful, method 400 can end.

FIG. 5 is flow diagram of an example method 500 of a mobile device and smart card improved BMC login authentication. When BMC 104 has been initialized (i.e., smartcard authentication has been enabled) a user can login to BMC by smartcard 124 and mobile device 126.

Method 500 can begin at step 502. At step 502, BMC 104 can determine if smartcard 124 is valid (as illustrated above). When BMC 104 has been validated, method 500 can proceed to step 504. At step 504, mobile device 126 can successfully pair (i.e., establish a connection) with USB adapter 116 by short-range wireless adapter 118. For example, mobile device 126 can access to server 102 and BMC 104 after a successfully pairing. When mobile device 126 has successfully paired with USB adapter 116, method 500 can proceed to step 506. At step 506, the passcode of smartcard 124 can be transmitted to BMC 104 for authentication. When the passcode of smartcard 124 has been transmitted to BMC 104, method 500 can proceed to step 508.

At step 508, BMC 104 can authenticate (i.e., verify) the passcode of mobile device 126 (as illustrated in FIG. 6). At step 510, BMC 104 can transmit the result of the authentication at step 508 to mobile device 126. When the results of the authentication are unsuccessful, mobile device 126 is not authorized to manage BMC 104 and method 500 can end. When the results of the authentication are successful, mobile device 126 can begin management of BMC 104 (e.g., monitor server 102). When the results of the authentication are successful, method 500 can end.

FIG. 6 is flow diagram of an example method 600 of a saving a passcode of an improved BMC login authentication. Smartcard 124 can be configured to store a passcode. In some embodiments, the passcode can be a random number. In some embodiments, the passcode can be user-defined. In some embodiments, the passcode can be encrypted (e.g., secret key, private key, etc.).

Method 600 can begin at step 602. At step 602, BMC 104 can generate a random number. The random number can be transferred, from BMC 104 to smartcard 124 through USB adapter 116 (by smartcard reader 122). Smartcard 124 can store the random number in memory (e.g., EEPROM). When the random number has been generated, transmitted, and stored the method can proceed to step 604.

At step 604, smartcard 124 can encrypt the random number (e.g., with a secret key, private key, etc.). Smartcard 124 can include an encryption key (e.g., secret key, private key, etc.). After smartcard 124 has encrypted the random number, the encrypted random number can be transmitted to BMC 104. The BMC 104 can store, in memory (e.g., flash ROM, etc.), the received encrypted random number as the smartcard 124 passcode. When the random number has been encrypted, transmitted, and stored as smartcard 124 passcode, method 600 can end.

Figure 7:
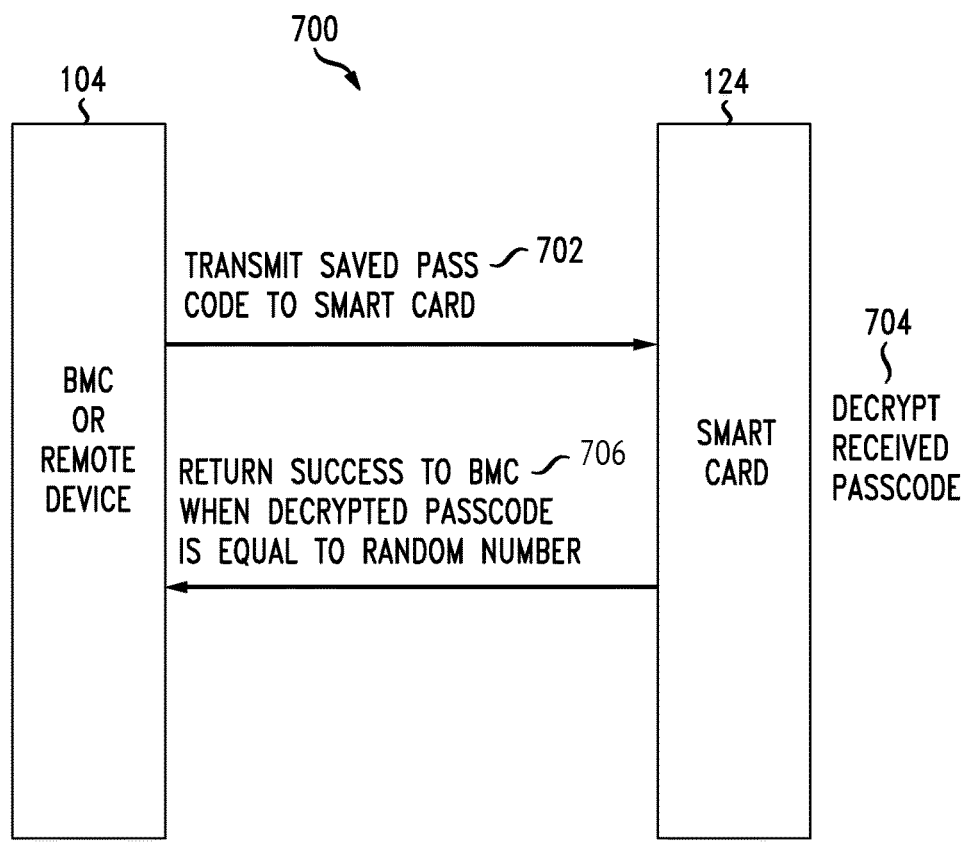
FIG. 7 is flow diagram of an example method of verifying a passcode of an improved BMC login authentication.

FIG. 7 is flow diagram of an example method 700 of verifying a passcode of an improved BMC login authentication. Smartcard 124 can be used to verify the authenticity of mobile device 126. For example, an administrator can access BMC 104 by USB adapter 116. The administrator can insert smartcard 124 into USB adapter 116 at smartcard reader 122 and wirelessly coupled mobile device 126 to USB adapter 116 by short-range wireless adapter 118. Smartcard 124 can then authenticate the previously stored passcode in BMC 104 to verify mobile device 126 (and the administrator) have the appropriate credentials for accessing BMC 104.

Method 700 can begin at step 702. At step 702, BMC 104 can transmit, through USB adapter 116, to smartcard 124 the encrypted smartcard passcode (i.e., as illustrated above in method 500). When BMC 104 has transmitted the encrypted smartcard passcode to smartcard 124, the method can proceed to step 704.

At step 704, smartcard 124 can receive and decrypt the encrypted smartcard passcode. For example, smartcard 124 can decrypt the encrypted smartcard passcode using the same encryption key (e.g., secret key, private key, etc.) used to encrypt the random number (i.e., in method 500). When the encrypted smartcard passcode has been decrypted, smartcard 124 can compare the decrypted smartcard passcode with the previously stored random number (i.e., in method 500). When the encrypted smartcard passcode has been decrypted and compared to the previously stored random number, the method can proceed to step 706.

At step 706, smartcard 124 can transmit to the BMC 104 the results of the comparison between the previously stored random number and the decrypted smartcard passcode. When the decrypted smartcard passcode is equal to the previously stored random number, the smartcard 124 can return an authentication success to BMC 104. When the decrypted smartcard passcode is not equal to the previously stored random number, the smartcard 124 can return an authentication failure to BMC 104. When smartcard 124 has returned a success or failure to BMC 104, the method 700 can end.

Figure 8:
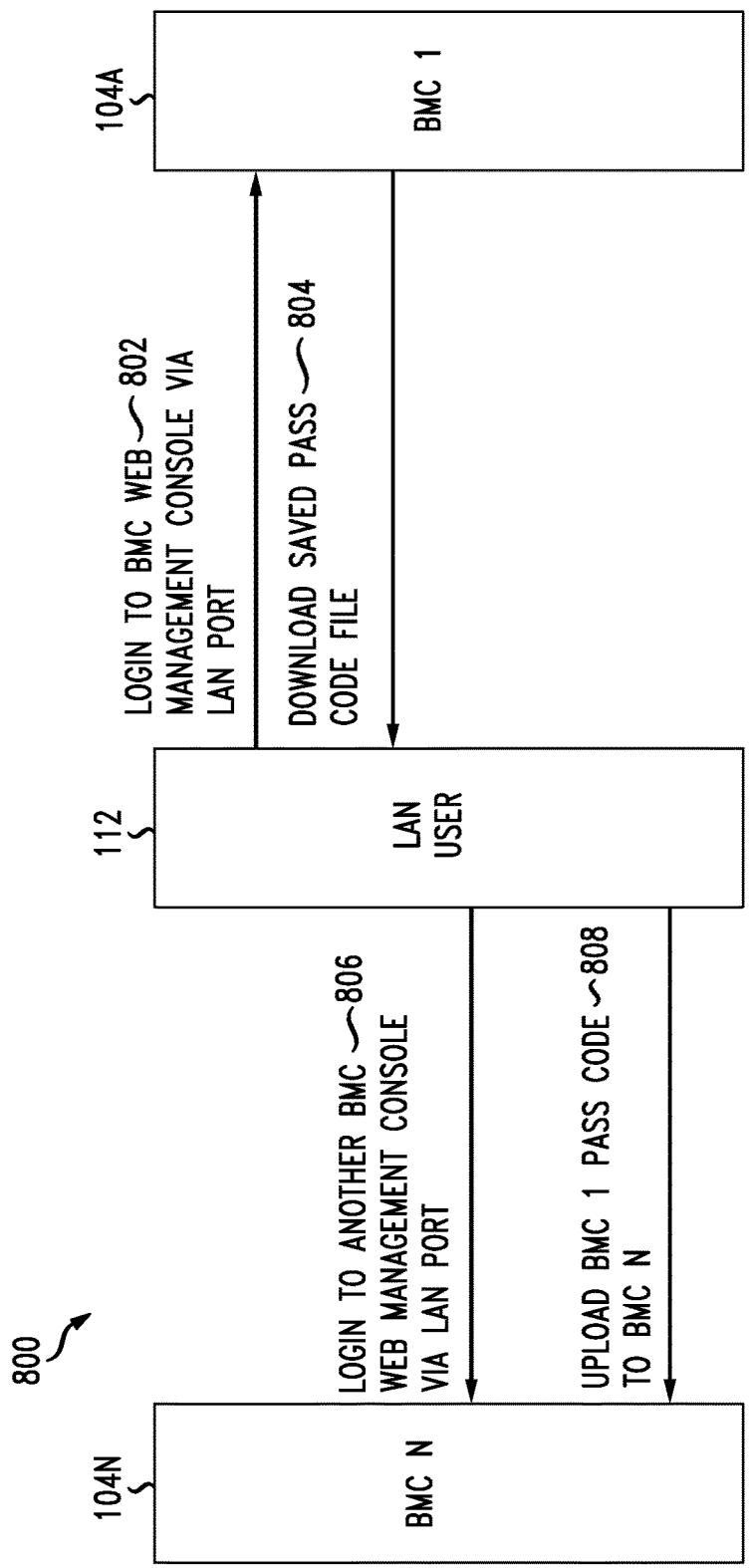
FIG. 8 is flow diagram of an example method of exporting and importing a passcode of an improved BMC login authentication in a multi-node environment.

FIG. 8 is flow diagram of an example method 800 of exporting and importing a passcode of an improved BMC login authentication in a multi-node environment. In some embodiments an administrator can have multiple BMCs (and servers) to manage. Multiple smartcards can be difficult to manage. In some embodiments, a single smartcard (per administrator) can manage multiple BMCs. Smartcard authentication is based on an encrypted smartcard passcode. A single smartcard can manage multiple BMC, when the each BMC has stored the encrypted smartcard passcode associated with the single smartcard.

Method 800 can begin at step 802. At step 802, LAN user 112 can login to BMC 104A (e.g., through web browser 114 over LAN port 110). When LAN user 112 has logged in to BMC 104A, method 800 can proceed to step 804. At step 804, LAN user 112 can download the encrypted smartcard passcode. For example, the encrypted smartcard passcode can be the passcode saved in method 500 of FIG. 5. When LAN user 112 has downloaded the encrypted smartcard passcode, the method 800 can proceed to step 806. At step 806, LAN user 112 can login to BMC 104N. For example, LAN user 112 can login to BMC 104N (e.g., through web browser 114 over LAN port 110). In some embodiments, BMC 104N can be a plurality of different BMCs. In some embodiments, BMC 104N can be one BMC of a plurality of different BMCs. When LAN user 112 has logged in to BMC 104N, method 800 can proceed to step 808. At step 808, LAN user 112 can upload the encrypted smartcard passcode to BMC 104N. For example, the BMC 104N can receive and store, in memory (e.g., flash ROM, etc.), the encrypted smartcard passcode. When the BMC 104N has received and stored the encrypted passcode in memory, method 800 can end.

Figure 9:
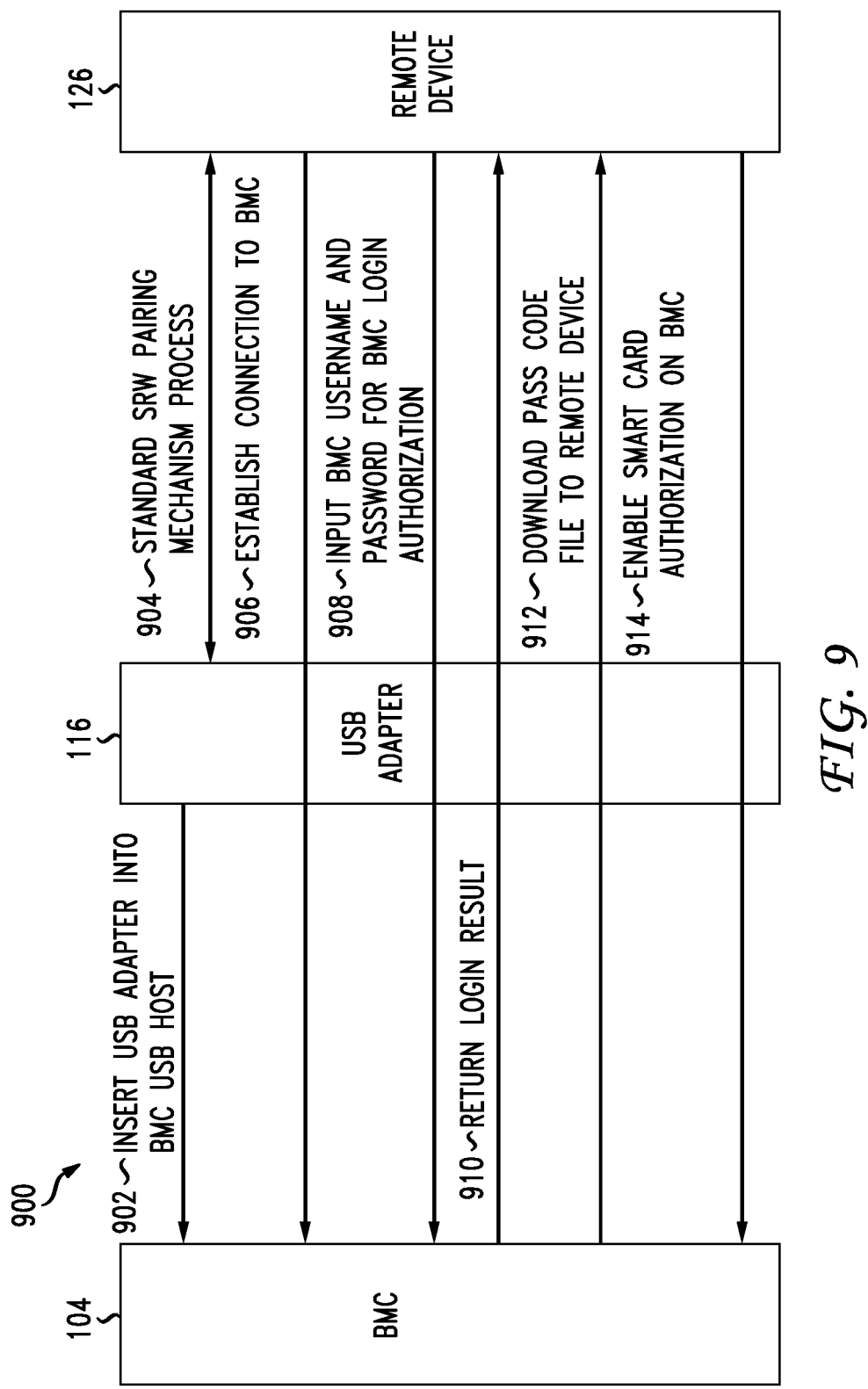
FIG. 9 is flow diagram of an example method of exporting and importing a passcode of an improved BMC login authentication in a mobile device.

FIG. 9 is flow diagram of an example method 900 of exporting and importing a passcode of an improved BMC login authentication in a mobile device. A system administrator can enable authorization between mobile device 126 and BMC 104 (through USB adapter 116). To enable authorization between mobile device 126 and BMC 104, the encrypted smart passcode can be transmitted from BMC 104 and stored, in the memory, of mobile device 126. When mobile device 126 has the encrypted smartcard passcode, mobile device 126 can be enabled for authorization at BMC 104.

Method 900 can begin at step 902. At step 902, a USB adapter 116 can be coupled to server 102 at USB port 108. When the USB adapter 116 has been coupled to server 102, method 900 can proceed to step 904.

At step 904, mobile device 126 can communicatively couple (i.e., by short-range wireless) with USB adapter 116. In some embodiments, mobile device 126 can pair with USB adapter 116, by short-range wireless adapter 118, using secure simple pairing (SSP). When mobile device 126 has successfully coupled to USB adapter 116, method 900 can proceed to step 906.

At step 906, mobile device 126 can establish a connection with BMC 104. For example, mobile device 126 can access server 102 and BMC 104 through USB adapter 116, after a successfully pairing in step 204. When mobile device 126 has successfully established a connection with BMC 104, method 900 can proceed to step 908.

At step 908, mobile device 126 can transmit login credentials to BMC 104. For example, an administrator of mobile device 126 can enter a user name and password for BMC 104. When login credentials have been transmitted to BMC 104, the method 900 can proceed to step 910. At step 910, BMC 104 can receive the login credentials, authenticate the credentials, and return the results to mobile device 126. For example, BMC 104 can receive a user name and password, authenticate the user name and password as valid, and return to the mobile device 126 an unsuccessful authentication (i.e., when the user name and password are incorrect) or a successful authentication (i.e., when the user name and password are correct). In some embodiments, the authentication is performed by a comparison of encrypted login credentials stored in a database. When the results of the login authentication have been returned to the mobile device 126, method 900 can proceed to step 912.

At step 912, mobile device 126 can download encrypted passcode file stored in memory from BMC 104. For example, the encrypted passcode file stored in memory of BMC 104 in method 500 of FIG. 5. When the encrypted passcode file has been downloaded to mobile device 126, method 900 can proceed to step 914.

At step 914, mobile device 126 can enable on BMC 104 smartcard authorization using a smart card. For example, the system administrator (i.e., of mobile device 126) can enable or disable smartcard authorization for BMC 104 (i.e., allow smartcard authorization or not allow smartcard authorization). In some embodiments, smartcard authorization is already enable and the system administrator does not have to enable smartcard authorization. When smartcard authorization has been enabled, the method 900 can end.

It is believed the exemplary embodiment and its advantages will be understood from the foregoing description, and it will be apparent that various changes may be made thereto without departing from the spirit and scope of the disclosure or sacrificing all of its advantages, the examples hereinbefore described merely being preferred or exemplary embodiments of the disclosure.

The invention claimed is:

1. A method for a combination wireless and smartcard login authentication, the method comprising:
   detecting, by a baseboard management controller (BMC) of a server, a smartcard being inserted into a USB adapter of the server, the BMC being a specialized microcontroller coupled to one or more motherboards of the server, and configured to manage an interface between server hardware and server management software, and enable a system administrator to remotely monitor the server;
   in response to the detecting, enabling smartcard authorization on the BMC;
   validating, by the BMC, the smartcard to yield a validation;
   establishing, by the BMC, a wireless connection with a remote device based on the validation;
   in response to the establishing, receiving, by the BMC, a smartcard passcode from the smartcard;
   verifying, by the BMC, the smartcard passcode to yield a verification;
   in response to the verifying, authorizing, by the BMC, the remote device access to the BMC based on the verification;
   generating, at the BMC, a random number;
   transferring, from the BMC, the random number to the smartcard; and
   receiving, at the BMC, an encrypted random number from the smartcard, wherein the encrypted random number is encrypted by the smartcard based upon the random number.

2. The method of claim 1, the further comprising:
   receiving, at the server, an encrypted passcode, wherein the encrypted passcode is an encrypted random number generated from the random number; and
   storing, by the BMC, the encrypted passcode as the smartcard passcode.

3. The method of claim 1, the verifying further comprising:
   transmitting, from the server, the smartcard passcode, wherein the smartcard passcode is encrypted; and
   receiving, at the server, a successful verification when the decrypted smartcard passcode is equal to a previously stored random number.

4. The method of claim 1, further comprising:
   receiving, at the server, login credentials for a console session;
   authenticating, at the server, the login credentials; and
   transmitting, from the server, the smartcard passcode, wherein the smartcard passcode is encrypted.

5. The method of claim 4, further comprising:
   receiving, at a second server, the login credentials for the console session;
   authenticating, at the second server, the login credentials; and
   receiving, at the second server, the encrypted smartcard passcode.

6. The method of claim 1, further comprising:
   receiving login credentials;
   authenticating the login credentials;
   transmitting the smartcard passcode; and
   enabling smartcard authorization.

7. The method of claim 1, wherein the USB adapter is connected to the BMC via a USB host of the BMC.

8. A server for a combination wireless and smartcard login authentication, the server comprising:
   a processor;
   a baseboard management controller (BMC), the BMC being a specialized microcontroller coupled to one or more motherboards of the server, and configured to manage an interface between server hardware and server management software, and enable a system administrator to remotely monitor the server; and
   a memory coupled to the processor to store instructions, which when executed by the processor, cause the BMC to perform operations of:
   detect, by the BMC, a smartcard being inserted into a USB adapter of the server;
   in response to the detecting, enable smartcard authorization on the BMC;
   validate, by the BMC, the smartcard to yield a validation;
   establish, by the BMC, a wireless connection with a remote device based on the validation;
   in response to the establishing, receive, by the BMC, a smartcard passcode;
   verify, by the BMC, the smartcard passcode to yield a verification;
   in response to the verifying, authorize, by the BMC, the remote device access to the BMC based on the verification;
   generate, at the BMC, a random number;
   transfer, from the BMC, the random number to the smartcard; and
   receive, at the BMC, an encrypted random number from the smartcard, wherein the encrypted random number is encrypted by the smartcard based upon the random number.

9. The server of claim 8, wherein the memory stores further instructions which when executed by the processor cause the processor to perform further operations of:
   receive an encrypted passcode, wherein the encrypted passcode is an encrypted random number generated from the random number; and
   store, by the BMC, the encrypted passcode as the encrypted passcode.

10. The server of claim 8, wherein the memory stores further instructions which when executed by the processor cause the processor to perform further operations of:
    transmit the smartcard passcode, wherein the smartcard passcode is encrypted; and
    receive a successful verification when the decrypted smartcard passcode is equal to a previously stored random number.

11. The server of claim 8, wherein the memory stores further instructions which when executed by the processor cause the processor to perform further operations of:
    receive login credentials for a console session;
    authenticate the login credentials; and
    transmit the smartcard passcode, wherein the smartcard passcode is encrypted.

12. The server of claim 11, wherein the memory stores further instructions which when executed by the processor cause the processor to perform further operations of:
    receive, at a second server, the login credentials for the console session;
    authenticate, at the second server, the login credentials; and
    receive, at the second server, the encrypted smartcard passcode.

13. The server of claim 8, wherein the memory stores further instructions which when executed by the processor cause the processor to perform further operations of:
  receive login credentials;
  authenticate the login credentials;
  transmit the smartcard passcode; and
  enable smartcard authorization.

14. A non-transitory computer-readable medium containing instructions that, when executed by a processor of a server, causes a baseboard management controller (BMC) of the server to perform operations of;
  detect, by the BMC, a smartcard being inserted into a USB adapter of the server, the BMC being a specialized microcontroller coupled to one or more motherboards of the server, and configured to manage an interface between server hardware and server management software, and enable a system administrator to remotely monitor the server;
  in response to the detecting, enable smartcard authorization on the BMC;
  validate, by the BMC, the smartcard to yield a validation;
  establish, by the BMC, a wireless connection with a remote device based on the validation;
  in response to the establishing, receive, by the BMC, a smartcard passcode;
  verify, by the BMC, the smartcard passcode to yield a verification;
  in response to the verifying, authorize, by the BMC, the remote device access to the BMC based on the verification;
  generate, at the BMC, a random number;
  transfer, from the BMC, the random number to the smartcard; and
  receive, at the BMC, an encrypted random number from the smartcard, wherein the encrypted random number is encrypted by the smartcard based upon the random number.

15. The non-transitory computer-readable medium of claim 14, contains further instructions which when executed by the processor cause the processor to perform further operations of:
  receive an encrypted passcode, wherein the encrypted passcode is an encrypted random number generated from the random number; and
  store, by the BMC, the encrypted passcode as the smartcard passcode.

16. The non-transitory computer-readable medium of claim 14, contains further instructions which when executed by the processor cause the processor to perform further operations of:
  transmit the smartcard passcode, wherein the smartcard passcode is encrypted; and
  receive a successful verification when the decrypted smartcard passcode is equal to a previously stored random number.

17. The non-transitory computer-readable medium of claim 14, contains further instructions which when executed by the processor cause the processor to perform further operations of:
  receive login credentials for a console session;
  authenticate the login credentials; and
  transmit the smartcard passcode, wherein the smartcard passcode is encrypted.

18. The non-transitory computer-readable medium of claim 14, contains further instructions which when executed by the processor cause the processor to perform further operations of:
  receive login credentials;
  authenticate the login credentials;
  transmit the smartcard passcode; and
  enable smartcard authorization.

\* \* \* \* \*